(12) United States Patent
Huxford

(10) Patent No.: US 10,619,331 B2
(45) Date of Patent: *Apr. 14, 2020

(54) CONVEYANCE DRAIN EMITTER

(71) Applicant: Charles Jacob (CJ) Huxford, Bellingham, WA (US)

(72) Inventor: Charles Jacob (CJ) Huxford, Bellingham, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/031,351

(22) Filed: Jul. 10, 2018

(65) Prior Publication Data
US 2018/0320341 A1 Nov. 8, 2018

Related U.S. Application Data

(63) Continuation of application No. 15/093,611, filed on Apr. 7, 2016, now Pat. No. 10,017,920.

(60) Provisional application No. 62/178,307, filed on Apr. 7, 2015.

(51) Int. Cl.
*E04D 13/08* (2006.01)
*E03B 1/04* (2006.01)
*E03F 1/00* (2006.01)

(52) U.S. Cl.
CPC ............ *E03B 1/042* (2013.01); *E03F 1/002* (2013.01); *E04D 13/08* (2013.01); *E03B 2001/047* (2013.01); *E04D 2013/0806* (2013.01); *E04D 2013/0813* (2013.01); *E04D 2013/0853* (2013.01); *Y10T 137/6969* (2015.04)

(58) Field of Classification Search
CPC ............ E04D 13/08; E04D 2013/0806; E04D 2013/0813; E04D 2013/0853; E03B 2001/047; Y10T 137/6969
See application file for complete search history.

(56) References Cited

U.S. PATENT DOCUMENTS

| | | | | |
|---|---|---|---|---|
| 4,161,186 A | * | 7/1979 | Sitarz | E04D 13/08 137/356 |
| 4,620,817 A | * | 11/1986 | Cushing | C02F 3/046 137/357 |
| 5,533,303 A | * | 7/1996 | Harvey | E03B 3/02 52/16 |
| 5,681,455 A | * | 10/1997 | Takai | E03B 3/02 210/154 |

(Continued)

*Primary Examiner* — Kevin F Murphy
(74) *Attorney, Agent, or Firm* — Michael R. Schacht; Schacht Law Office, Inc.

(57) ABSTRACT

A rainwater collection system comprises a vault assembly and a drain emitter. At least a portion of the vault assembly is underground and is located above percolation region in the ground. The drain emitter is connected to the conveyance line such that a primary portion of the collected water flows into the at least one storage tank and a secondary portion of the collected water flows out of the conveyance line through the drain emitter at a preset emitter flow rate. The drain emitter is arranged within the vault assembly, above the percolation region, and below the conveyance opening. The preset emitter flow rate is predetermined such that the flow of the secondary portion of the collected water out of the conveyance line through the drain emitter drains standing water from the conveyance line and the secondary portion of the collected water percolates through the percolation region.

20 Claims, 3 Drawing Sheets

(56) References Cited

U.S. PATENT DOCUMENTS

| | | | | |
|---|---|---|---|---|
| 5,730,179 A * | 3/1998 | Taylor | E03B 3/03 | 137/357 |
| 5,735,304 A * | 4/1998 | Chumley | E03B 3/02 | 137/15.01 |
| 5,810,510 A * | 9/1998 | Urriola | E02B 11/005 | 137/236.1 |
| 5,863,151 A * | 1/1999 | Chapotelle | E03B 3/02 | 405/52 |
| 5,882,508 A * | 3/1999 | St-Jacques | E03F 1/002 | 210/170.01 |
| 6,526,699 B1 * | 3/2003 | Foglio, Sr. | E03B 3/03 | 52/15 |
| 6,941,702 B1 * | 9/2005 | Abrams | E03B 1/041 | 52/16 |
| 7,395,633 B2 * | 7/2008 | Baeta | E03B 3/03 | 52/16 |
| 7,493,728 B2 * | 2/2009 | Dussault | E03B 3/03 | 52/16 |
| 7,736,090 B2 * | 6/2010 | Janesky | E03F 1/002 | 405/42 |
| 7,775,232 B2 * | 8/2010 | Takai | E03B 3/02 | 137/122 |
| 10,017,920 B1 * | 7/2018 | Huxford | E03F 1/002 | |
| 2010/0037962 A1 * | 2/2010 | Ryan | E03B 3/03 | 137/357 |
| 2013/0248016 A1 * | 9/2013 | Blair | E03B 3/02 | 137/357 |

\* cited by examiner

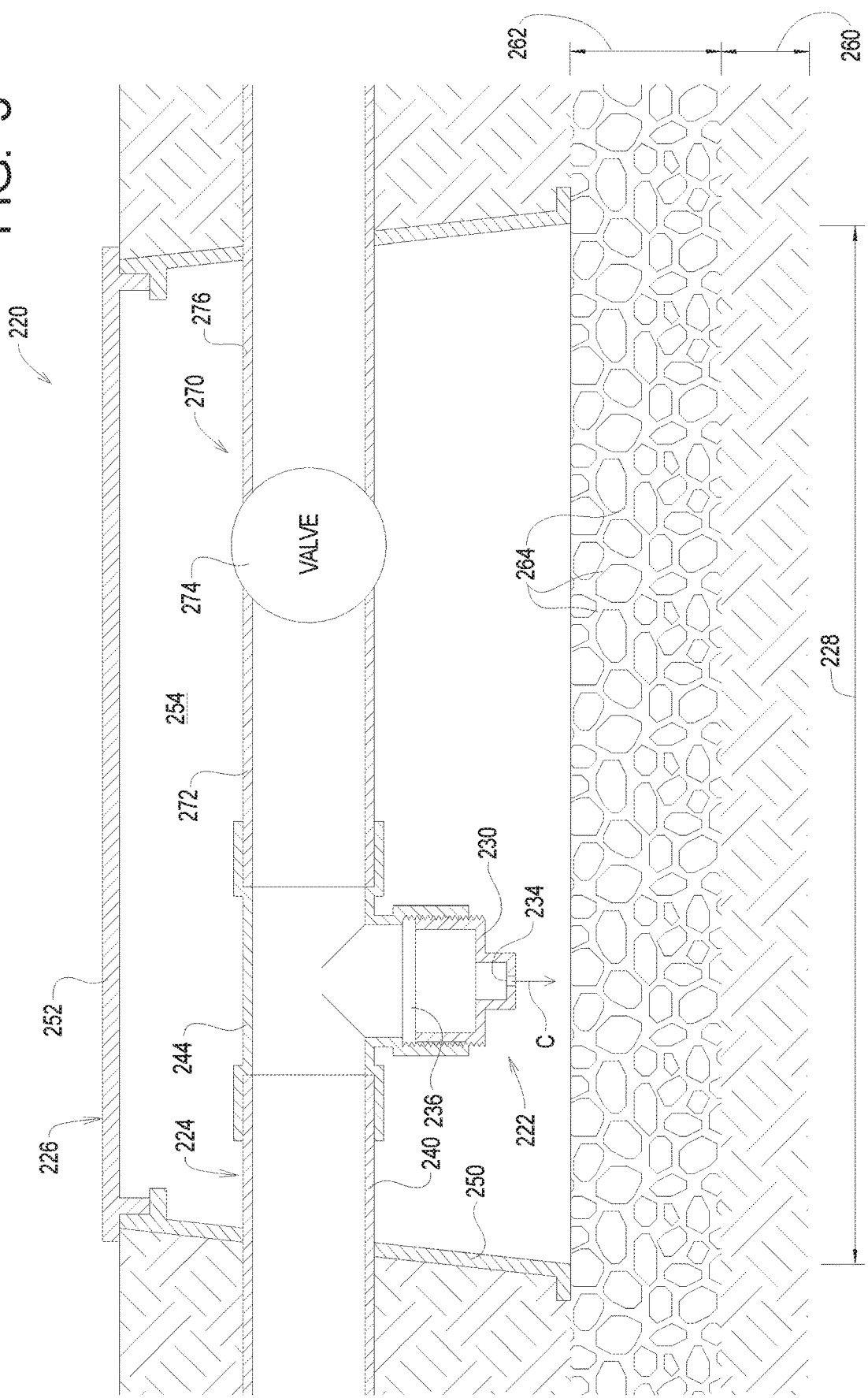

CONVEYANCE DRAIN EMITTER

RELATED APPLICATIONS

This application, U.S. patent application Ser. No. 16/031,351 filed Jul. 10, 2018, is a continuation application of U.S. patent application Ser. No. 15/093,611 filed Apr. 7, 2016, currently pending.

U.S. patent application Ser. No. 15/093,611 filed Apr. 7, 2016 claims benefit of U.S. Provisional Application Ser. No. 62/178,307 filed Apr. 7, 2015.

The contents of all related applications are incorporated herein by reference.

TECHNICAL FIELD

The present invention relates to rainwater collection systems and methods and, more particularly, to rainwater collection systems and methods adapted for use in cold environments.

BACKGROUND

Rainwater collecting on impermeable surfaces such as structures and pavement can create opportunities for water onsite reuse and problems for onsite or offsite storm water management systems. For both reuse and rainwater management, rainwater collecting on impermeable surfaces may be channeled into a rainwater detention/retention tank. The rainwater detention/retention tank may be used to store and slowly release collected rainwater to the sewer or stormwater management system (detention) or to manage collected rainwater onsite through soil infiltration, dispersion, and or recycling/reuse (retention). The term "storage tank" will be used herein to refer to a tank used for either rainwater detention or rainwater retention.

A storage tank is typically part of a larger rainwater collection system comprising ancillary components such as pipes, valves, pumps, and the like. The storage tank itself and the ancillary components forming the rainwater collection system may be made of any suitable material such as plastic, fiberglass, concrete, or steel.

At least some of a rainwater collection system, and often the entire rainwater collection system, is typically exposed to the elements. The storage tank and ancillary components forming the rainwater collection system can thus be exposed to temperatures below the freezing point of water and thus are susceptible to damage when freezing water within the rainwater collection system expands.

The need thus exists for systems and methods for reducing the risk that rainwater collection systems will be damaged by freezing water.

SUMMARY

The present invention may be embodied as a rainwater collection system for managing water flowing through a conveyance line to a conveyance opening in at least one storage tank, where at least a portion of the conveyance line is located underground and above a percolation region in the ground. The rainwater collection system comprises a vault assembly and a drain emitter. At least a portion of the vault assembly is underground and is located above the percolation region in the ground. The drain emitter is connected to the conveyance line such that a primary portion of the collected water flows into the at least one storage tank and a secondary portion of the collected water flows out of the conveyance line through the drain emitter at a preset emitter flow rate. The drain emitter is arranged within the vault assembly, above the percolation region, and below the conveyance opening. The preset emitter flow rate is predetermined such that the flow of the secondary portion of the collected water out of the conveyance line through the drain emitter drains standing water from the conveyance line and the secondary portion of the collected water percolates through the percolation region.

The present invention may also be embodied as an emitter system for removing standing water from a conveyance line operatively connected between a downspout and a conveyance opening in at least one storage tank, where at least a portion of the conveyance line is underground and is adjacent to a percolation region in the ground. The emitter system comprises a vault assembly and a drain emitter. At least a portion of the vault assembly is adapted to be buried underground. The drain emitter comprises an emitter housing and a flow control member supported by the emitter housing to define an emitter opening. The drain emitter is adapted to be connected to the conveyance line such that a primary portion of the collected water flows into the at least one storage tank, a secondary portion of the standing water flows continuously out of the conveyance line through the emitter opening at a preset emitter flow rate, and the drain emitter is arranged within the vault assembly, above the percolation region, and below the conveyance opening. The flow control member is displaced relative to the emitter housing to set the preset emitter flow rate such that the secondary portion of the collected water flows out of the drain emitter to drain standing water from the conveyance line and the secondary portion of the collected water percolates through the percolation region.

The present invention may also be embodied as a method of removing standing water from a conveyance line operatively connected between a downspout and a conveyance opening in at least one storage tank. At least a portion of the conveyance line is underground and is adjacent to a percolation region in the ground. The method comprises the following steps. A vault assembly is provided. At least a portion of the vault assembly is adapted to be buried underground. A drain emitter is provided. The drain emitter comprises an emitter housing and a flow control member supported by the emitter housing to define an emitter opening. The drain emitter is operatively connected to the conveyance line such that a primary portion of the collected water flows into the at least one storage tank, a secondary portion of the standing water flows continuously out of the conveyance line through the emitter opening at a preset emitter flow rate, and the drain emitter is arranged within the vault assembly, above the percolation region, and below the conveyance opening. The flow control member is arranged relative to the emitter housing to set the preset emitter flow rate such that the secondary portion of the collected water flows out of the drain emitter to drain standing water from the conveyance line, and the secondary portion of the collected water percolates through the percolation region.

BRIEF DESCRIPTION OF THE DRAWINGS

FIG. 3 is a side elevation, somewhat schematic view of a second example emitter system that may be used by the first example rainwater collection system of the present invention.

DETAILED DESCRIPTION

Figure 1:
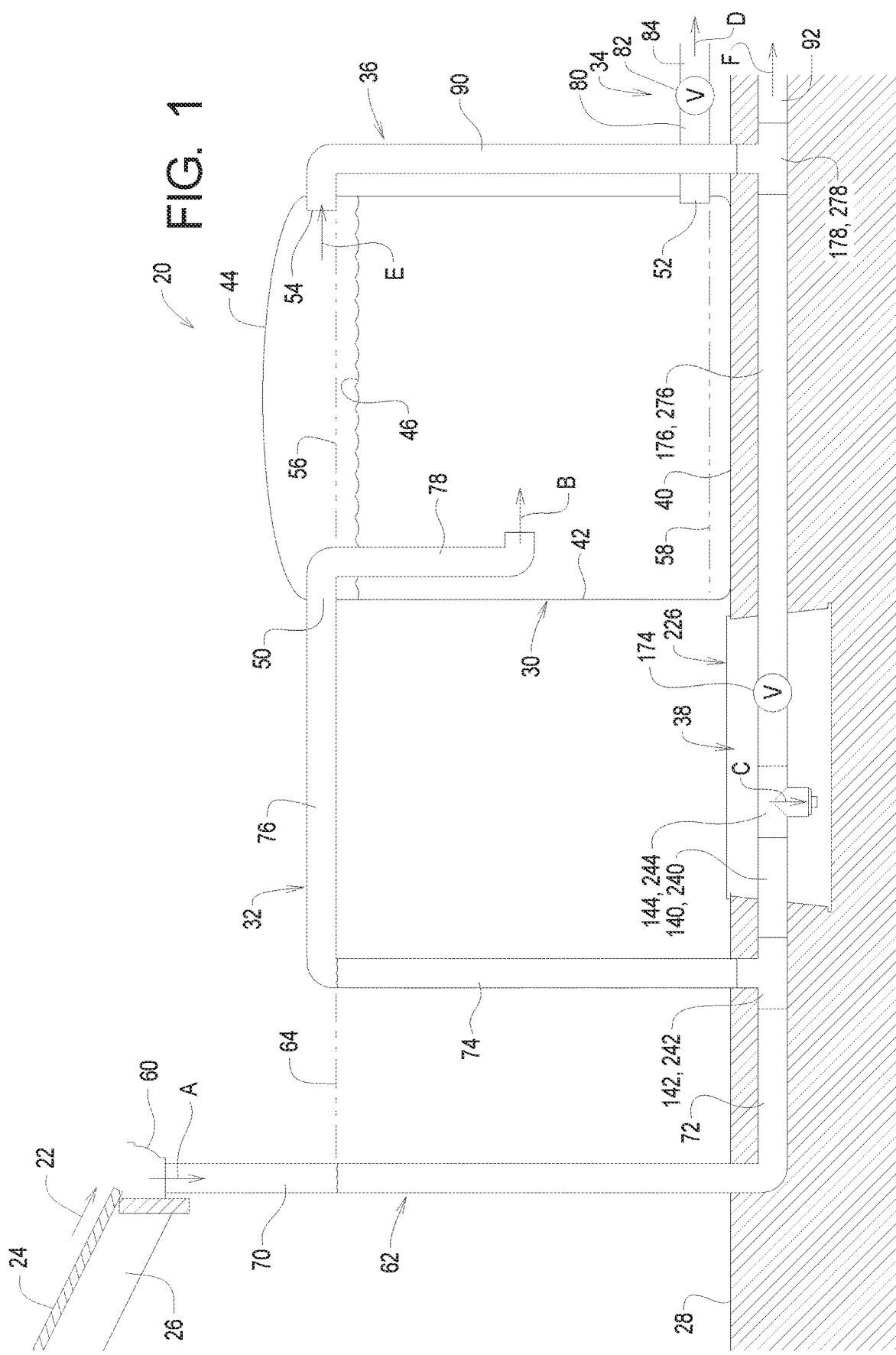
FIG. 1 is a side elevation, somewhat schematic view of a first example of a rainwater collection system of the present invention.

Referring initially to FIG. 1 of the drawing, depicted therein is a rainwater collection system 20 constructed in accordance with, and embodying, the principles of the present invention. The example rainwater collection system 20 is configured to collect rainwater 22 from a roof 24 of a structure 26. At least a portion of the example rainwater collection system 20 is supported by and/or buried in the ground 28.

I. General Operation of Rainwater Collection System

The example rainwater collection system 20 comprises at least one storage tank 30, at least one conveyance system 32, a removal system 34, an overflow system 36, and at least one emitter system 38. The storage tank 30, conveyance system 32, removal system 34, and overflow system 36 are or may be conventional, and examples of each are shown and described herein only to that extent necessary for a complete understanding of the present invention. Two examples of the emitter system 38 forming part of the example rainwater collection system 20 of the present invention will be described herein below.

In the following discussion, the term "flow rate" will generally be used to refer to the flow of fluid such as water per unit time. In the context of a rainwater collection system such as the example rainwater collection system 20, the term "maximum flow rate" refers to the maximum flow of fluid per unit time as determined by invariable design parameters of various components of the rainwater collection system. The term "preset flow rate" refers to the maximum flow of fluid per unit time as determined by the setting of one or more variable components of the rainwater collection system. The term "actual flow rate" refers to the flow of fluid per unit time at a particular point in time and under a particular set of conditions and typically will be less than the maximum flow rate. The actual flow rate will typically vary depending on factors such as amount and duration of rainfall, snow melt, or the like.

The example storage tank 30 comprises a bottom wall 40, a side wall 42, and a top wall 44. Water stored within the example storage tank 30 defines a stored water level 46. A conveyance opening 50, a removal opening 52, and an overflow opening 54 are formed in the side wall 42 of the example storage tank 30. A given rainwater collection system 20 may comprise more than one storage tank 30.

The overflow opening 54 defines a maximum water level 56 defined by the water stored within the example storage tank 30, and the removal opening 52 defines a minimum water level 58 defined by the water stored within the example storage tank 30. The example conveyance opening 50 is above the maximum water level 56. As will be described in further detail below, the stored water level 46 will typically vary over time between the maximum water level 56 and the minimum water level 58 depending upon various environmental conditions such as amount of rainwater 22 that falls on the roof 24 and amount of water removed from the removal opening 52 over time.

FIG. 1 illustrates that the example conveyance system 32 comprises a gutter 60 supported below edge of the roof 24 and a conveyance line 62 operatively connected between the gutter 60 and the conveyance opening 50 and between the gutter 60 and the emitter system 38. The example conveyance line 62 comprises a downspout 70 connected to the gutter 60, a buried pipe 72, a stand pipe 74, an inlet pipe 76 that extends through the conveyance opening 50, and a drop pipe 78 within the example storage tank 30. The example conveyance line 62 is sealed from the downspout 70 to the drop pipe 78. The example conveyance line 62 is completely sealed and defines a conveyance water level 64 that corresponds to a vertical height of the conveyance opening 50.

The example removal system 34 comprises an outlet pipe 80 that extends through the removal opening 52, an outlet valve 82, and a removal pipe 84. The outlet valve 82 controls flow of fluid out of the tank 30 through the outlet pipe 80 and then out of the removal system 34 through the removal pipe 84. The removal pipe 84 may be connected to a stormwater detention system (not shown) and/or a stormwater retention system (not shown) for re-use or ground infiltration. The removal pipe 84 may also be connected to the overflow system 36 as will be discussed below.

The example overflow system 36 comprises an overflow pipe 90 that extends through the overflow opening 54 and an overflow line 92. The overflow system 36 is below the conveyance opening 50 and is configured to allow water to be removed from the example storage tank 30 when the tank 30 is full to prevent back up of water into the conveyance system 32. The overflow line 92 may be connected to a stormwater detention system (not shown) and/or a stormwater retention system (not shown) for re-use or ground infiltration. The overflow line 92 may optionally be connected to the removal pipe 84 of the removal system 34.

The emitter system 38 is connected to a bottom portion of the conveyance line 62 to allow standing water within the conveyance line 62 to flow out of the conveyance line 62 at an emitter flow rate. A maximum emitter flow rate is predetermined based on the parameters of the rainwater collection system 20, the percolation rate of the soil forming the ground 28, and possibly environmental conditions such as weather. A preset emitter flow rate is predetermined based on variable parameters of the emitter system 38. The emitter system 38 is in particular configured to remove water from the conveyance line 62 to prevent damage to the conveyance line 62 during freezing conditions.

The example rainwater collection system 20 operates basically as follows. Rainwater 22 that falls on the roof 24 is collected by the gutter 60 and enters the conveyance line 62 as shown by arrow A. A primary portion of the collected water flows through the conveyance line 62 and into the storage tank 30 as shown by arrow B at a conveyance flow rate. A secondary portion of the collected water flows out of the conveyance line 62 through the emitter system 38 as shown by arrow C at a preset emitter flow rate.

The maximum conveyance flow rate is determined by the parameters of the conveyance line 62 such as minimum cross-sectional area. The amount of rain that falls on the roof 24 and is collected by the conveyance system 32 and the amount of water removed by the removal system 34 and/or overflow system 36 in a given time period will determine the actual conveyance flow rate of the conveyance system 32 and the stored water level 46 within the storage tank 30.

The removal system 34 removes water from the storage tank 30 at a removal flow rate as shown by arrow D. A maximum removal flow rate is determined by invariable parameters of the removal system 34 such as minimum cross-sectional area of piping and the like. A preset removal flow rate is determined by variable parameters of the removal system 34 such as the cross-sectional area of a valve opening. Ideally, the removal flow rate at which the removal system 34 removes water from the storage tank 30 can be accommodated by the stormwater detention system and/or stormwater retention system connected to the removal system 34. Also ideally, the storage tank 30 will be sized and dimensioned to store sufficient water during periods of heavy rain to accommodate the removal flow rate.

However, if the actual conveyance flow rate exceeds the preset removal flow rate for a sufficient period of time, the amount of water that accumulates within the storage tank 30 will exceed the maximum water level, and the overflow system 36 will remove water from the storage tank 30 as shown by arrow E to prevent over-filling of and possibly damage to the storage tank 30.

Typically, the maximum conveyance flow rate will be much larger than the preset removal flow rate from the removal system 34 but is sized to be substantially equal to a maximum overflow flow rate of the overflow system 36. During normal operation of the rainwater collection system 20 when collecting rainwater (e.g., water is flowing into the storage tank(s) 30), substantially all of the rainwater is conveyed by the conveyance system 32 to the storage tank(s) 30 and out of the storage tank(s) 30 by the removal system 34 and/or overflow system 36.

The preset emitter flow rate determined by the example emitter system 38 is significantly less than both the maximum conveyance flow rate and the actual conveyance flow rate at any point in time. The preset emitter flow rate will typically also be significantly less than the preset removal flow rate. Typically, the preset emitter flow rate is predetermined such that normal collection and disposition of water by the rainwater collection system 20 under most conditions is substantially unaffected by the emitter system 38.

The emitter system 38 is connected at or near the lowest point of the conveyance line 62 such that hydrostatic pressure from the water shown by arrow A entering the conveyance system 32 will force water through the conveyance line 62 and into the tank(s) 30, with only a relatively small amount flowing into and out of the emitter system 38. However, when water is not entering the conveyance system 32, water stands within the conveyance line 62, initially at the conveyance water level 64. During freezing conditions, expansion of this standing water as it freezes can pose a risk of damage to exposed components forming the conveyance line 62 such as the downspout 70 and stand pipe 74.

By removing standing water from the conveyance line 62 at the preset emitter flow rate, the emitter system 38 encourages water movement within the conveyance line 62 and will remove such standing water from the conveyance line 62 after a sufficient time period, assuming no new water is introduced into the conveyance line 62 (unlikely during freezing conditions). Both water movement and eventual removal of the standing water discourage freezing of water within the conveyance line 62 and thus reduce the likelihood of damage to the components of the conveyance line 62.

The actual conveyance flow rate, actual removal flow rate, actual overflow flow rate, and actual emitter flow rate will depend upon environmental factors such as rainwater collected over a given period of time. The maximum conveyance flow rate, preset removal flow rate, overflow flow rate, and preset emitter flow rate will depend upon the parameters of a specific rainwater collection system constructed in accordance with the principles of the present invention.

In the example rainwater collection system 20, the preset emitter flow rate is approximately 1 gallon per hour but in any event may be within a first range of substantially between 0.5 gallons per hour to 3 gallons per hour or within a second range of substantially between 0.1 gallons per hour to 10 gallons per hour. The preset emitter flow rate may be predetermined to empty the conveyance line 62 of standing water in approximately 8 hours but in any event should empty the conveyance line 62 within a first time range of substantially between 6 and 10 hours or a second time range of substantially between 2 and 16 hours. In general, a rainwater collection system of the present invention may have a preset emitter flow rate that is substantially between within a first range of 0.1% to 5% of the maximum conveyance flow rate. In any event, the preset emitter flow rate may be within a second range of substantially between 0.1% and 20% of the maximum conveyance flow rate.

To summarize, the example emitter system 38 is designed to work with a wet conveyance piping network such as the conveyance line 62 for a rainwater harvesting system such as the example rainwater collection system 20. The emitter system 38 allows water to flow to the storage tank(s) 30 when it is raining, though will drain the majority of the water within the wet conveyance line over the course of a designated time once it stops raining.

The purpose of the example emitter system 38 is thus to drain rainwater from the conveyance line 62 during winter months to prevent damage to pipes, valves, and fittings from freezing weather, while still allowing most of the rain to go to the storage tank during rain events. The example emitter system 38 is typically affixed at the lowest point of the conveyance system and in a location where it can be easily accessed. The device may optionally be housed in an irrigation box if below ground. The area below the emitter system is typically dug out and at least partly covered with drain rock to facilitate drainage of water away from the irrigation box as it empties from the emitter system 38.

With the foregoing general understanding of the construction and operation of the example stormwater detection system 20 in mind, the details of two examples of emitter systems that may be used as the example emitter system 38 will now be described.

II. First Example Emitter System

Figure 2:
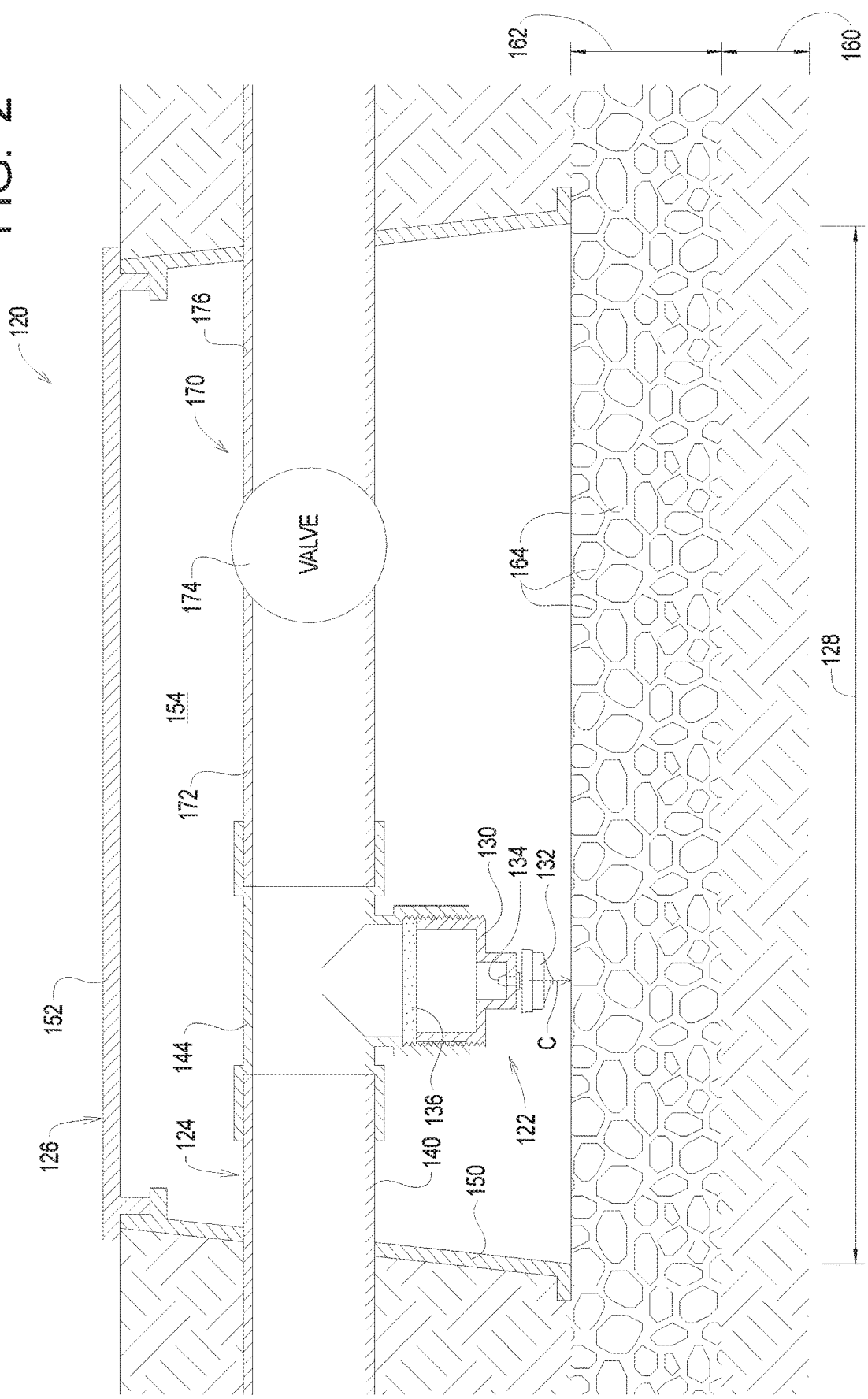
FIG. 2 is a side elevation, somewhat schematic view of a first example emitter system that may be used by the first example rainwater collection system of the present invention.

Referring now to FIG. 2 of the drawing, depicted therein is a first example emitter system 120 that may be used as the example emitter system 38 of the example stormwater detention system 20. The first example emitter system 120 comprises an emitter assembly 122, an emitter inlet line 124, an optional vault assembly 126, and an emitter percolation region 128. The emitter inlet line 124 is connected to the conveyance line 62 such that water flowing through the conveyance line 62 also flows to the emitter assembly 122. The example emitter assembly 122 is arranged within the vault assembly 126, and the vault assembly 126 is arranged above the emitter percolation region 128.

The first example emitter system 120 operates basically as follows. Water from the conveyance line 62 flows through the emitter inlet line 124 to the emitter assembly 122. The water flowing through the water inlet line 124 will flow out of the emitter inlet outlet assembly 122 at the preset emitter flow rate. Water flowing out of the emitter assembly 122 enters the percolation region 128 and percolates into the ground 28.

With the foregoing general understanding of the first example emitter system 120 in mind, the details of the construction and operation of the first example emitter system 120 will now be described in further detail.

The example emitter assembly 122 comprises an emitter housing 130 and a flow control member 132. The emitter housing 130 and flow control member 132 cooperate to define an emitter opening 134. The example emitter assembly 122 may be a conventional drip emitter designed for use with irrigation systems. An optional emitter filter member 136 may be arranged upstream of the emitter opening 134. The optional filter member 136 may be a wire mesh filter, a porous material (e.g., open-cell foam or porous solid material such as ceramic, metal, or plastic) or fibrous material (e.g., geotextile filter fabric) capable of impeding or restricting flow of water and preventing organic debris from clogging emitter opening 134, without substantially degrading over time.

The emitter inlet line 124 comprises an emitter inlet pipe 140, a conveyance T-fitting 142 (FIG. 1), and an emitter internal fitting 144. The conveyance T-fitting 142 is connected to the conveyance line 62, and the emitter inlet pipe 140 is connected between the conveyance T-fitting 142 and the emitter internal fitting 144. The conveyance T-fitting 142 should be located at the lowest point of the conveyance line 62 or possibly near the lowest point of the conveyance line 62 if so long as the conveyance T-fitting 142 can be insulated from ambient air (e.g., underground). In any event, the example emitter internal fitting 144 is configured and arranged to support the emitter housing 130 within the emitter vault assembly 126 above the emitter percolation region 128.

The example emitter vault assembly 126 comprises a vault housing 150 and a vault lid 152 and defines an emitter vault chamber 154. The vault housing 150 has a vault bottom opening facing the emitter percolation region 128 and vault top opening that may be selectively covered by the vault lid 152. The example emitter vault chamber 154 provides a volume of space in which a portion of the emitter line 124 extends. In the first example emitter system 120, the example emitter housing 130, flow control member 132, and optional bypass valve 148 are located with the emitter vault chamber 154.

Removal of the vault lid 152 (open configuration) thus facilitates access to the emitter housing 130 and flow control member 132 and optional bypass valve 148 through the top opening defined by the vault housing 150. With the vault lid 152 in place over the vault top opening (closed configuration), the vault chamber 154 is enclosed and insulated from ambient temperatures. Mulch, gravel, dirt or the like may be placed on top of the vault lid 152 in its closed configuration to provide additional insulation between ambient air and the vault chamber 154 but removed to allow removal of the vault lid and access to the vault chamber 154.

The example emitter percolation region 128 comprises a first percolation layer 160 of the ground 28 under the vault assembly 126. To improve percolation of water into the percolation region 128, a second percolation layer 162 of material such as drain rock 164 may be arranged on top of the first percolation layer 160 and below open bottom of the vault assembly 126. The percolation layer 128 should be designed as necessary to percolate water flowing out of the emitter assembly 122 at the emitter flow rate.

Optionally, an emitter line 170 comprising an emitter intermediate pipe 172, a bypass valve 174, and an emitter outlet pipe 176 may be connected to the emitter assembly 122. If the optional emitter intermediate pipe 172, bypass valve 174, and emitter outlet pipe 176 are used, the emitter internal fitting 144 is a T-fitting, and the emitter intermediate pipe 172 is connected between the emitter internal fitting 144. The bypass valve 174 is connected between the emitter intermediate pipe 172 and the emitter outlet pipe 176. The emitter line 170 may optionally further comprise an overflow T-fitting 178 that allows the emitter outlet pipe 176 to be connected to the overflow line 92 as shown in FIG. 1. Removal of the vault lid 152 (open configuration) also facilitates access to the bypass valve 174 through the top opening defined by the vault housing 150.

In use, the emitter housing 130 is connected to the emitter internal fitting 144 with the emitter opening 134 at the bottom of the emitter housing 130. The flow control member 132 and, if used, the optional emitter filter 136 may be configured to set the preset emitter flow rate at which water flows through the emitter line 124, through the emitter housing 130, and out of the emitter opening 134. The example flow control member 132 is rotated relative to the emitter housing 130 to set the preset emitter flow rate. The preset emitter flow rate should be predetermined to allow sufficient flow of water out of the conveyance line 62 to prevent freezing of standing water within the conveyance line 62 but not to exceed the rate at which water percolates into the percolation region 128.

In addition, in anticipation of periods of extended freezing, the optional bypass valve 148 may be operated to drain the conveyance line 62 as shown by arrow F in FIG. 1 and eliminate any possibility of freezing of the water within the conveyance line 62.

III. Second Example Emitter System

Referring now to FIG. 3 of the drawing, depicted therein is a second example emitter system 220 that may be used as the example emitter system 38 of the example stormwater detention system 20. The second example emitter system 220 comprises an emitter assembly 222, an emitter inlet line 224, a vault assembly 226, and an emitter percolation region 228. The emitter inlet line 224 is connected to the conveyance line 62 such that water flowing through the conveyance line 62 also flows to the emitter assembly 222. The example emitter assembly 222 is arranged within the vault assembly 226, and the vault assembly 226 is arranged above the emitter percolation region 228.

The second example emitter system 220 operates basically as follows. Water from the conveyance line 62 flows through the emitter inlet line 224 to the emitter assembly 222. The water flowing through the water inlet line 224 will flow out of the emitter inlet outlet assembly 222 at the preset emitter flow rate. Water flowing out of the emitter assembly 222 enters the percolation region 228 and percolates into the ground 28.

With the foregoing general understanding of the second example emitter system 220 in mind, the details of the construction and operation of the second example emitter system 220 will now be described in further detail.

The example emitter assembly 222 comprises an emitter housing 230 and an emitter cap 232. The example emitter cap 232 defines an emitter opening 234. An optional emitter filter member 236 may be arranged upstream of the emitter opening 234. The example emitter cap 232 is formed by an off-the-shelf pipe fitting designed to prevent fluid flow but in which a hole has been formed to define the emitter opening 234. The optional filter member 236 may be a wire mesh filter, a porous material (e.g., open-cell foam or porous solid material such as ceramic, metal, or plastic) or fibrous material (e.g., geotextile filter fabric) capable of impeding or restricting flow of water and organic debris from clogging opening 234, without substantially degrading over time.

The emitter inlet line 224 comprises an emitter inlet pipe 240, a conveyance T-fitting 242 (FIG. 1), and an emitter internal fitting 244. The conveyance T-fitting 242 is connected to the conveyance line 62, and the emitter inlet pipe 240 is connected between the conveyance T-fitting 242 and the emitter internal fitting 244. The example emitter internal fitting 244 is configured and arranged to support the emitter housing 230 within the emitter vault assembly 226 above the emitter percolation region 228.

The example emitter vault assembly 226 comprises a vault housing 250 and a vault lid 252 and defines an emitter vault chamber 254. The vault housing 250 has a vault bottom opening facing the emitter percolation region 228 and vault top opening that may be selectively covered by the vault lid 252. The example emitter vault chamber 254 provides a volume of space in which a portion of the emitter line 224 extends. In the second example emitter system 220, the example emitter housing 230, emitter cap 232, and optional bypass valve 248 are located with the emitter vault chamber 254. Removal of the vault lid 252 (open configuration) thus facilitates access to the emitter housing 230, flow control member 232, and bypass valve 248 through the top opening defined by the vault housing 250. With the vault lid 252 in place over the vault top opening (closed configuration), the vault chamber 254 is enclosed and insulated from ambient temperatures. Mulch, gravel, dirt or the like may be placed on top of the vault lid 252 in its closed configuration to provide additional insulation between ambient air and the vault chamber 254 but removed to allow removal of the vault lid and access to the vault chamber 254.

The example emitter percolation region 228 comprises a first percolation layer 260 of the ground 28 under the vault assembly 226. To improve percolation of water into the percolation region 228, a second percolation layer 262 of material such as drain rock 264 may be arranged on top of the first percolation layer 260 and below the vault assembly 226. The percolation layer 228 should be designed as necessary to percolate water flowing out of the emitter assembly 222 at the preset emitter flow rate.

Optionally, an emitter line 270 comprising an emitter intermediate pipe 272, a bypass valve 274, and an emitter outlet pipe 276 may be connected to the emitter assembly 222. If the optional emitter intermediate pipe 272, bypass valve 274, and emitter outlet pipe 276 are used, the emitter internal fitting 244 is a T-fitting, and the emitter intermediate pipe 272 is connected between the emitter internal fitting 244. The bypass valve 274 is connected between the emitter intermediate pipe 272 and the emitter outlet pipe 276. The emitter line 270 may optionally further comprise an overflow T-fitting 278 that allows the emitter outlet pipe 276 to be connected to the overflow line 92 as shown in FIG. 2.

In use, emitter housing 230 is connected to the emitter internal fitting 244 with the emitter opening 234 at the bottom of the emitter housing 230. The emitter opening 234 formed in the emitter cap and, if used, the optional emitter filter 236 may be configured to prevent debris from clogging opening 234 and to set the preset emitter flow rate at which water flows through the emitter line 224, through the emitter housing 230, and out of the emitter opening 234. The emitter opening 234 may be formed, for example, by drilling a hole in the emitter cap 232 having a diameter to determine or preset a maximum emitter flow rate, and then the preset emitter flow rate may be adjusted (reduced) using the emitter filter 236. The preset emitter flow rate should be predetermined to allow sufficient flow of water out of the conveyance line 62 to prevent freezing of standing water within the conveyance line 62 but not to exceed the rate at which water percolates into the percolation region 228.

In addition, in anticipation of periods of extended freezing, the optional bypass valve 248 may be operated to drain the conveyance line 62 and eliminate any possibility of freezing of the water within the conveyance line 62.

IV. Additional Considerations

In the example rainwater collection system 20, portions of the conveyance line 62 and the entire emitter system 38 are arranged underground. In other rainwater collection systems to which the principles of the present invention may be applied, the entire conveyance line 62 and the emitter system 38 may be arranged above ground. The emitter system 38 would work in the same basic manner above ground as below ground, but an above ground emitter system will be more susceptible to multiple brief freezing events or unexpected, quick-onset freezing events that cause standing water within the conveyance line 62 to freeze before the emitter system 38 can sufficiently drain such standing water.

Further, in addition or instead, either of the example emitter systems 120 or 220 may be used as one or more removal emitter systems to disperse water exiting the tank(s) 30 through the removal system 34. In this case, the emitter systems 120 and 220 would be connected to the removal system 34 and arranged at one or more removal emitter locations having sufficient permeability to allow water to permeate into the ground 26. The preset flow rate of such a removal emitter system would be sized and dimensioned as appropriate for the permeability of the source emitter location(s) but could be as high as 100% of the conveyance flow rate should permeability of the removal emitter location allow.

What is claimed is:

1. A rainwater collection system for managing water flowing through a conveyance line to a conveyance opening in at least one storage tank, where at least a portion of the conveyance line is located underground and above a percolation region in the ground, the rainwater collection system comprising:
    a vault assembly, where at least a portion of the vault assembly is underground and is located above the percolation region in the ground; and
    a drain emitter connected to the conveyance line such that
        a primary portion of the collected water flows into the at least one storage tank; and
        a secondary portion of the collected water flows out of the conveyance line through the drain emitter at a preset emitter flow rate; wherein
    the drain emitter is arranged within the vault assembly, above the percolation region, and below the conveyance opening; and
    the preset emitter flow rate is predetermined such that
        the flow of the secondary portion of the collected water out of the conveyance line through the drain emitter drains standing water from the conveyance line; and
        the secondary portion of the collected water percolates through the percolation region.

2. A rainwater collection system as recited in claim 1, in which
    the conveyance line defines a maximum conveyance flow rate; and
    the preset emitter flow rate is within a range of between 0.1% and 20% of the maximum conveyance flow rate.

3. A rainwater collection system as recited in claim 1, in which:

the conveyance line defines a maximum conveyance flow rate; and the preset emitter flow rate is within a range of between 0.1% and 5% of the maximum conveyance flow rate.

4. A rainwater collection system as recited in claim 1, in which the preset emitter flow rate is within a range of between 0.1 gallons per hour and 10 gallons per hour.

5. A rainwater collection system as recited in claim 1, in which the preset emitter flow rate is within a range of between 0.5 gallons per hour and 3 gallons per hour.

6. A rainwater collection system as recited in claim 1, in which the preset emitter flow rate is selected to drain standing water from the conveyance line in a time range of between 2 hours and 16 hours.

7. A rainwater collection system as recited in claim 1, in which the preset emitter flow rate is selected to drain standing water from the conveyance line in a time range of between 6 hours and 10 hours.

8. A rainwater collection system as recited in claim 1, in which the drain emitter comprises:
an emitter housing; and
a flow control member; wherein
the flow control member and the emitter housing cooperate to define an emitter opening through which the secondary portion of the collected water flows out of the drain emitter.

9. A rainwater collection system as recited in claim 8, in which the flow control member is rotated relative to the emitter housing to set the preset emitter flow rate.

10. A rainwater collection system as recited in claim 9, in which the drain emitter further comprises an emitter filter arranged to filter the secondary portion of the collected water before the secondary portion of the collected water flows through the emitter opening.

11. An emitter system for removing standing water from a conveyance line operatively connected between a downspout and a conveyance opening in at least one storage tank, where at least a portion of the conveyance line is underground and is adjacent to a percolation region in the ground, the emitter system comprising:
a vault assembly, where at least a portion of the vault assembly is adapted to be buried underground;
a drain emitter comprising
an emitter housing, and
a flow control member supported by the emitter housing to define an emitter opening; wherein
the drain emitter is adapted to be connected to the conveyance line such that
a primary portion of the collected water flows into the at least one storage tank,
a secondary portion of the standing water flows continuously out of the conveyance line through the emitter opening at a preset emitter flow rate, and
the drain emitter is arranged within the vault assembly, above the percolation region, and below the conveyance opening; and
the flow control member is displaced relative to the emitter housing to set the preset emitter flow rate such that
the secondary portion of the collected water flows out of the drain emitter to drain standing water from the conveyance line, and
the secondary portion of the collected water percolates through the percolation region.

12. An emitter system as recited in claim 11, in which:
the conveyance line defines a maximum conveyance flow rate; and
the preset emitter flow rate is within a range of between 0.1% and 20% of the maximum conveyance flow rate.

13. An emitter system as recited in claim 11, in which:
the conveyance line defines a maximum conveyance flow rate; and
the preset emitter flow rate is within a range of between 0.1% and 5% of the maximum conveyance flow rate.

14. An emitter system as recited in claim 11, in which the preset emitter flow rate is within a range of between 0.1 gallons per hour and 10 gallons per hour.

15. An emitter system as recited in claim 11, in which the preset emitter flow rate is within a range of between 0.5 gallons per hour and 3 gallons per hour.

16. An emitter system as recited in claim 11, in which the preset emitter flow rate is selected to drain standing water from the conveyance line in a time range of between 2 hours and 16 hours.

17. An emitter system as recited in claim 11, in which the preset emitter flow rate is selected to drain standing water from the conveyance line in a time range of between 6 hours and 10 hours.

18. An emitter system as recited in claim 11, further comprising an emitter filter arranged to filter the secondary portion of the collected water before the secondary portion of the collected water flows through the emitter opening.

19. A method of removing standing water from a conveyance line operatively connected between a downspout and a conveyance opening in at least one storage tank, where at least a portion of the conveyance line is underground and is adjacent to a percolation region in the ground, the method comprising the steps of:
providing a vault assembly, where at least a portion of the vault assembly is adapted to be buried underground;
providing a drain emitter comprising
an emitter housing, and
a flow control member supported by the emitter housing to define an emitter opening;
operatively connecting the drain emitter to the conveyance line such that
a primary portion of the collected water flows into the at least one storage tank,
a secondary portion of the standing water flows continuously out of the conveyance line through the emitter opening at a preset emitter flow rate, and
the drain emitter is arranged within the vault assembly, above the percolation region, and below the conveyance opening; and
arranging the flow control member relative to the emitter housing to set the preset emitter flow rate such that
the secondary portion of the collected water flows out of the drain emitter to drain standing water from the conveyance line, and
the secondary portion of the collected water percolates through the percolation region.

20. A method as recited in claim 19, further comprising the step of arranging an emitter filter to filter the secondary portion of the collected water before the secondary portion of the collected water flows through the emitter opening.

* * * * *